United States Patent
Hu et al.

(10) Patent No.: US 11,811,594 B1
(45) Date of Patent: Nov. 7, 2023

(54) MANAGING CLOUD NATIVE ZERO CONFIGURATION FEATURES OF ON PREMISES RESOURCES

(71) Applicant: Dell Products L.P., Round Rock, TX (US)

(72) Inventors: Bin Hu, Shanghai (CN); Baoli Chen, Shanghai (CN); Haijun Zhong, Shanghai (CN); Xiaojun Wu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/051,358

(22) Filed: Oct. 31, 2022

(30) Foreign Application Priority Data

Oct. 17, 2022 (CN) .......................... 202211269533.0

(51) Int. Cl.
*H04L 41/0806* (2022.01)
*H04L 41/08* (2022.01)
*H04L 41/0853* (2022.01)

(52) U.S. Cl.
CPC ...... *H04L 41/0806* (2013.01); *H04L 41/0853* (2013.01); *H04L 41/0886* (2013.01)

(58) Field of Classification Search
CPC ............. H04L 41/0806; H04L 41/0853; H04L 41/0886
See application file for complete search history.

(56) References Cited

U.S. PATENT DOCUMENTS

| | | | |
|---|---|---|---|
| 8,352,608 B1 * | 1/2013 | Keagy | G06F 9/45558 709/225 |
| 10,785,106 B1 * | 9/2020 | Nissimoff | G06F 8/60 |
| 2016/0028587 A1 * | 1/2016 | Garg | H04L 41/12 709/224 |
| 2017/0302519 A1 * | 10/2017 | Kumar | H04W 84/18 |
| 2018/0375731 A1 * | 12/2018 | Kachalia | H04L 41/0886 |
| 2019/0058635 A1 * | 2/2019 | Nandy | H04L 45/02 |
| 2019/0097900 A1 * | 3/2019 | Rodriguez | G06F 11/301 |
| 2020/0019468 A1 * | 1/2020 | Chinnam | G06F 11/1453 |
| 2020/0136909 A1 * | 4/2020 | Eaton | H04L 41/0873 |
| 2020/0344607 A1 * | 10/2020 | Ericksen | H04L 65/1045 |
| 2020/0351158 A1 * | 11/2020 | Krivenok | H04L 67/1097 |

(Continued)

*Primary Examiner* — Michael Won
(74) *Attorney, Agent, or Firm* — Jackson Walker L.L.P (57) ABSTRACT

A disclosed method includes obtaining, by a cluster manager, first zero configuration information, from one or more unconfigured nodes of an information handling system cluster. A service on the cluster manager may then generate custom zero configuration information for each of the unconfigured nodes and stored the custom zero configuration information in a zero configuration management store. Each unconfigured node may then retrieve its custom zero configuration information from the zero configuration management store and modify one or more zero configuration parameters of the unconfigured node in accordance with the custom zero configuration information. Disclosed methods may determine zero configuration criteria for configuring a node and identify, based on the custom zero configuration information in the zero configuration management store, unconfigured nodes of the cluster matching the zero configuration criteria. A zero touch configuration of the identified nodes may then be performed.

18 Claims, 4 Drawing Sheets

(56) References Cited

U.S. PATENT DOCUMENTS

| | | | |
|---|---|---|---|
| 2021/0211351 A1* | 7/2021 | Lin | H04L 41/0803 |
| 2021/0336849 A1* | 10/2021 | Boucadair | H04L 45/42 |
| 2022/0217057 A1* | 7/2022 | Schumaker | H04L 41/20 |
| 2023/0053702 A1* | 2/2023 | Gupta | G06F 9/4416 |
| 2023/0216734 A1* | 7/2023 | Kushwaha | H04L 61/4511 |
| | | | 709/222 |

* cited by examiner

MANAGING CLOUD NATIVE ZERO CONFIGURATION FEATURES OF ON PREMISES RESOURCES

TECHNICAL FIELD

The present disclosure relates to information handling system management and, more particularly, managing processes for configuring such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are deployed as hosts within an Internet Protocol (IP)-based computer network. To function within an IP network, a host must be associated with an IP address that uniquely identifies the host from all other hosts on the network. In addition, the host should have a human readable hostname and should be able to communicate with other hosts based on their corresponding hostnames.

The process of provisioning a system with an IP address and functionality for resolving hostnames may be referred to as configuring the system. While configuring a single system for deployment to a particular network can be done manually without too much trouble, e.g., by an IT administrator with physical access to the system, manual configuration quickly becomes impracticable for large data centers and enterprise networks.

Zero configuration generally refers to technology and processes that enable a system to configure itself for use in a network with little or no user intervention. Zero configuration may require information handling systems to have assigned values for at least a minimal set of network configuration settings. These settings may be referred to herein as zero configuration settings. Accordingly, makers and distributors of information handling systems typically assign factory-derived values for one or more zero configuration settings. Values assigned to zero configuration settings may be referred to herein as zero configuration information. To illustrate, an original equipment manufacturer (OEM) may provision a server or other type of system with a factory assigned hostname of the form "factory-nnnnnn", where factory may indicate the OEM and "nnnnnn" may be a serial number, asset tag, or the like that is unique within the OEM.

In a cloud native environment, the factory zero configuration information can be exchanged before deployment. However, when such a system is deployed within an enterprise's centrally managed on-premises IT, e.g., an entity's private data center, it is generally necessary, but not trivial, for an IT administrator to customize the zero configuration information for use within the entity's centralized environment management requirement. For example, an entity may deploy one or more hyperconverged infrastructure (HCI) appliances as one or more multi-node clusters. Without modifications of the factory zero configuration information, IT administrators may not have a proper way to configure or otherwise manage specific HCI nodes within a cluster.

Instead, before the management system can manage all unconfigured nodes, an IT administrator would need to access each HCI node to change the local zero configuration and add them to the centralized management system.

SUMMARY

Disclosed subject matter addresses issues and challenges associated with preserving zero configuration functionality within a centrally managed, on-premises cluster of HCI nodes. Disclosed methods enable IT administrators to replace factory zero configuration information on HCI cluster nodes with custom zero configuration information. The custom zero configuration information may reflect one or more deployment characteristics of the applicable node. For example, a node associated with a particular division or line of an entity may assigned a hostname that conveys the applicable division or line. As another example, the custom zero configuration information may include location information indicative of a physical location of a system, such as an identification of a server rack within a datacenter.

In at least some embodiments, each HCI cluster node includes a zero configuration service for communicating zero configuration information to other nodes and/or a cluster manager using, as an example, multi case domain name service (mDNS). The zero configuration information may contain the factory zero configuration values for one or more zero configuration parameters including, as illustrative examples, hostname, host type, service IP, media access control (MAC) address, product serial number, configuration state, location, and so forth. Additional zero configuration parameters may be added for customer-specific flags.

The HCI cluster manager can collect the factory zero configuration information from each unconfigured node over an L2 network and filter the zero configuration customized value to manage all unconfigured nodes. The HCI cluster manager can customize these identification values and save them in a zero configuration data store. Each HCI node may include a zero configuration check service to access the zero configuration data store and update its local zero configuration setting as needed to match the zero configuration information in the zero configuration data store.

A custom zero configuration management service of the HCI cluster manager may be configured to define custom zero configuration for the zero configuration data store. The service can fetch all zero configuration service and manually or automatically assign customized flags. The HCI manager can define a configuration plan with zero configuration criteria to trigger configuration of nodes with zero configuration meeting the criteria.

In this manner, disclosed methods and systems extend bare metal node discovery and resource management functionality to HCI cluster platforms. Disclosed features can manage on-premises zero configuration before executing HCI cluster configuration. The customized zero configuration information can be used by the cluster manager to define zero configuration criteria for selectively configuring cluster nodes.

In accordance with subject matter disclosed in the following description, a disclosed method includes obtaining, by a cluster manager, factory-assigned zero configuration information, also referred to herein as first zero configuration information, from one or more unconfigured nodes of an information handling system cluster. A service on the cluster manager may then generate custom zero configuration information for each of the unconfigured nodes and stored the custom zero configuration information in a zero configuration management store. Each unconfigured node may then retrieve its custom zero configuration information from the zero configuration management store and modify one or more zero configuration parameters of the unconfigured node in accordance with the custom zero configuration information.

In addition to generating custom zero configuration information, disclosed method may also determine zero configuration criteria for configuring a node and identify, based on the custom zero configuration information in the zero configuration management store, unconfigured nodes of the cluster matching the zero configuration criteria. A zero touch configuration of the identified nodes may then be performed.

The zero configuration information may include configuration state information indicative of a configuration state of a corresponding node, hostname information indicative of a hostname for a corresponding node, and location information indicative of physical location of a corresponding node. The location information may include rack identifying information indicative of a data center rack in which the node is installed.

Each node may be implemented as a hyperconverged infrastructure (HCI) appliance including compute, storage, and network hardware resources, as well as a central and automated cluster manager including HCI software to expose the virtualized compute, storage, and network resources to the cluster management.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
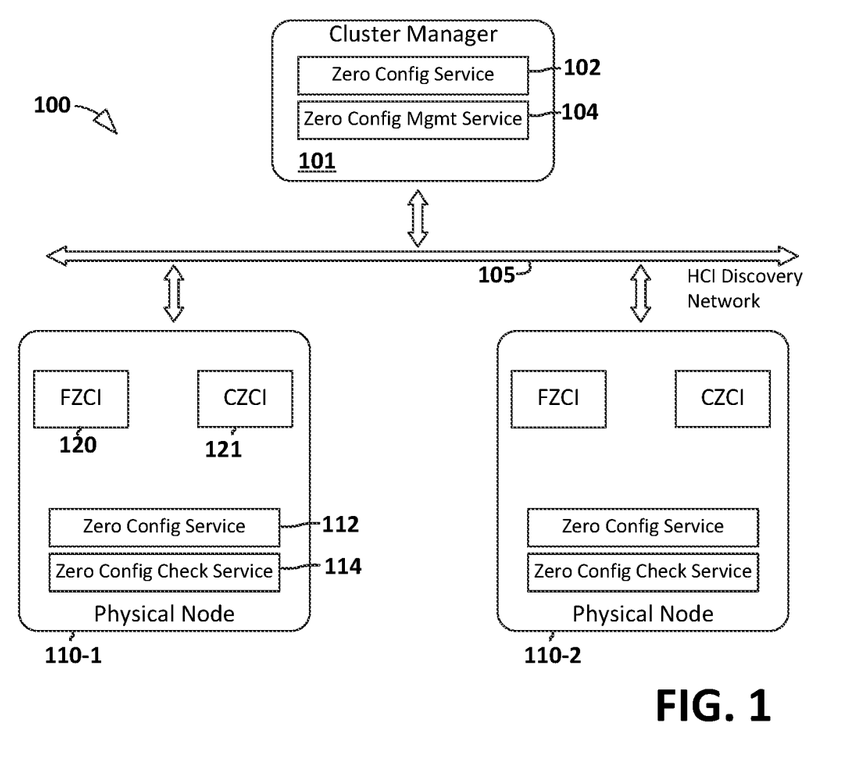
FIG. 1 illustrates an exemplary HCI cluster in accordance with disclosed teachings.

Referring now to the drawings, FIG. 1 depicts an exemplary multi-node HCI cluster, referred to herein simply as cluster 100, featuring support for custom zero configuration processes disclosed herein. The cluster 100 illustrated in FIG. 1 includes a cluster manager 101 communicatively coupled to a plurality of nodes 110 via a discovery network 105. For the sake of clarity, FIG. 1 depicts cluster 100 with only two nodes, 110-1, and 110-2, but it will be readily appreciated by those of skill that cluster 100 may include more than two nodes. In at least some embodiment, each node 110 is a physical node corresponding to a distinct group of hardware resources. In some embodiments, the hardware resources of each physical node are housed in a chassis dedicated to the node. In other embodiments, two or more physical nodes may share a chassis enclosure.

In at least one embodiment, each node 110 in cluster 100 is an HCI node. Each HCI node may include server-class processor, storage, and network hardware with HCI software for exposing virtualized compute, storage, and network resources to a central and automated management resource. In at least some embodiments, the HCI nodes may be implemented with any of the Dell Technologies VxRail line of HCI appliances and cluster manager 101 may include Dell Technologies VxRail Manager software.

As depicted in FIG. 1, zero configuration information may be exchanged between nodes 110 and cluster manager 101 via discovery network 105, a zero configuration service 102 in cluster manager 101, and a zero configuration service 112 in each node 110. In at least one embodiment, these elements implement an mDNS-compliant protocol for resolving hostnames to IP addresses within HCI discovery network 105.

In accordance with disclosed teachings for extending cloud native zero configuration functionality to a centrally managed on-premises cluster of nodes, the cluster 100 illustrated in FIG. 1 is provisioned with zero configuration management resources including a zero configuration management service 104 in cluster manager 101 and a zero configuration check service 114 in each node 110.

The zero configuration management resources of cluster 100 enable pre-configuration management of zero configuration parameters for cluster nodes 110. Accordingly, FIG. 1 illustrates a modification of original zero configuration information, identified as factory zero configuration information (FZCI) 120, to custom zero configuration information (CZCI) 121.

This management functionality supports user-assigned values for standard zero configuration parameters as well as the ability to create additional, customer-specific zero configuration parameters. In addition, the illustrated zero configuration management resources enable the cluster manager to perform selective configuration of cluster nodes 110 by setting custom values for zero configuration parameters, creating configuration criteria based on the custom zero configuration values, and performing configuration operations for nodes satisfying the configuration criteria. Exemplary functions and methods supported by disclosed zero configuration management resources are described in more detail in the following description of FIG. 2 through FIG. 5.

Figure 2:
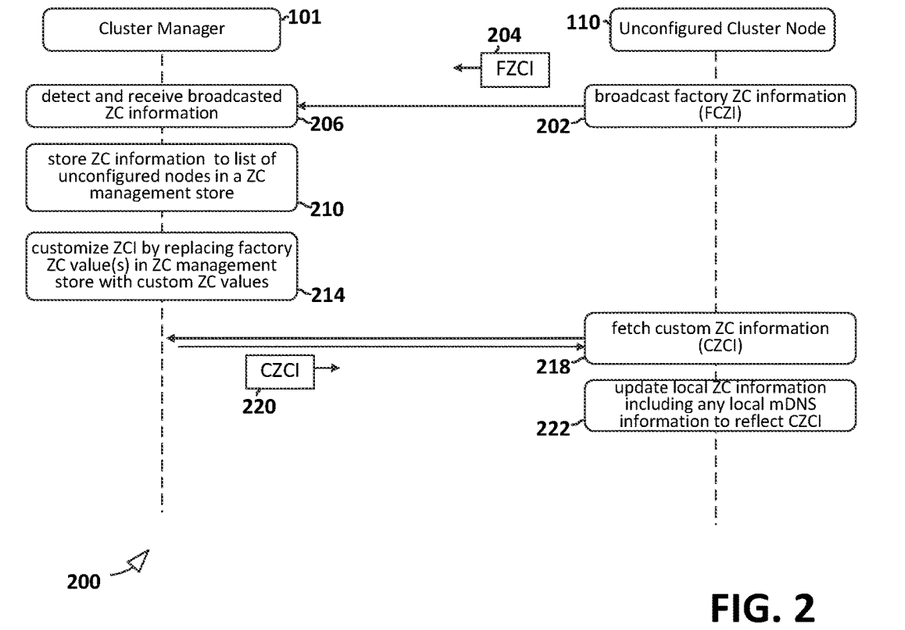
FIG. 2 illustrates a first zero configuration sequence diagram in accordance with disclosed teachings.

Referring now to FIG. 2, sequence diagram 200 illustrates an exemplary method for assigning user-defined values to the zero configuration parameters of one or more unconfigured nodes in an HCI cluster exemplified by the cluster 100 illustrated in FIG. 1. The operations depicted in sequence diagram 200 include operations performed by cluster manager 101 and an unconfigured node 110. The cluster manager operations depicted in FIG. 2 may be performed by the zero configuration service 102 (FIG. 1) in cluster manager 101, while the unconfigured node operations depicted in FIG. 2 may be performed by the zero configuration service 112 of node 110.

As suggested previously, cluster manager 101, nodes 110, and HCI discovery network 105 may implement and/or support a zero configuration protocol such as mDNS and, for the sake of brevity and clarity, the following descriptions may illustrate disclosed processes in the context of an mDNS implementation. Any such descriptions are illustrative rather than limiting and other suitable zero configuration protocols may be preferred in other implementations.

The sequence diagram 200 depicted in FIG. 2 begins with unconfigured node 110 executing an IP multicast command to broadcast (operation 202) its factory zero configuration information (FZCI) 204 on the HCI discovery network 105 (not depicted in FIG. 2). Cluster manager 101, upon detecting and receiving (operation 206) the FZCI 204 broadcasted by unconfigured node 110, stores (operation 210) the FZCI to a storage resource referred to herein as zero configuration management store (not depicted in FIG. 2). Operations 202, 206, and 210 may be performed by each unconfigured node in the applicable cluster, in which case the zero configuration management store will include the factory hostname and any other FZCI of each unconfigured node in the cluster.

The FZCI in the zero configuration management store may then be customized (operation 214) to replace factory zero configuration values for at least some of the zero configuration parameters with custom zero configuration values. Customizing the zero configuration parameters may be facilitated by providing a suitable zero configuration management interface to an IT administrator and customizing the zero configuration information in accordance with the administrator's input. In other embodiments, the customization may be at least partially automated by defining one or more policies for custom zero configuration information and customizing the zero configuration information in accordance with the applicable policy or policies.

The custom zero configuration information may convey one or more deployment-specific characteristics of the applicable node. In an illustrative embodiment, the custom zero configuration information may include a custom hostname and the custom hostname may convey one or more deployment-specific attributes of the applicable node. As an example, a custom hostname for a node allocated to a sales department or division may include or convey a reference to the sales group.

In a similar manner, the custom zero configuration information may include custom values for one or more additional zero configuration parameters. For example, the zero configuration parameters may include a location parameter that was assigned a value of null in the factory because the final location of the node would have been unknown before actual deployment. In such embodiments, the custom zero configuration information for the location parameter may reflect an attribute of the node's physical location, such as the identity of a data center and/or service rack where the node is physically installed. In this example, the custom zero configuration information for the location parameter may reflect an attribute of the node's geographical location and/or an attribute of the node's physical position within a datacenter or other environment.

As depicted in FIG. 2, unconfigured node 110 may then fetch (operation 218) the custom zero configuration information (CZCI) 220 from cluster manager 101. Unconfigured node 110 may then update (operation 222) its local zero configuration information, including any local mDNS information to match the custom zero configuration information in the zero configuration management store.

Figure 3:
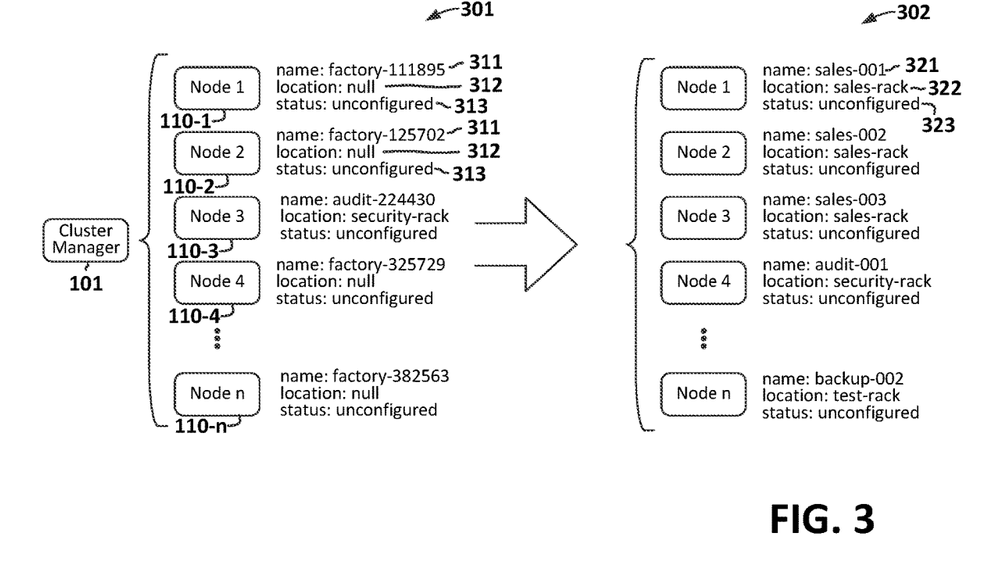
FIG. 3 illustrates exemplary zero configuration information following the operations illustrated in FIG. 2.

Turning now to FIG. 3, an example of zero configuration information customization in accordance with the sequence diagram 200 of FIG. 2 is presented. As depicted in FIG. 3, cluster manager 101 manages a cluster of "n" nodes, 110-1 through 110-n and zero configuration information is shown for each node before and after zero configuration information management operations, such as the operations illustrated in FIG. 2, are performed to establish custom zero configuration values for one or more unconfigured cluster nodes. As depicted in FIG. 3, the zero configuration information before customization is represented by reference numeral 301 while the zero configuration information after customization is performed is represented by reference numeral 302.

In the illustrated example, the zero configuration parameters include a hostname parameter, a location parameter, and a configuration status parameter. The values for each zero configuration parameter before customization occurs are equal to their respective factory values. As depicted in FIG. 3, the factory value 311 for the hostname parameter is a value of the format "factory-nnnnnn", where "nnnnnnn" is six digit factory-assigned number, the factory value 312 for the location parameter is equal to "null" and the factory value 313 for configuration status parameter is "unconfigured." After zero configuration information customization is performed, the custom value 321 for the hostname parameter of each node is of the form "department-nnn," where department indicates a working group within the applicable entity, the custom value 322 of location parameter is equal to "sales-rack" to indicate a server rack associated with the sales department, and the custom value 323 of the configuration status parameter remains as "unconfigured" because the applicable node has not been configured with an IP address and/or other configuration.

Figure 4:
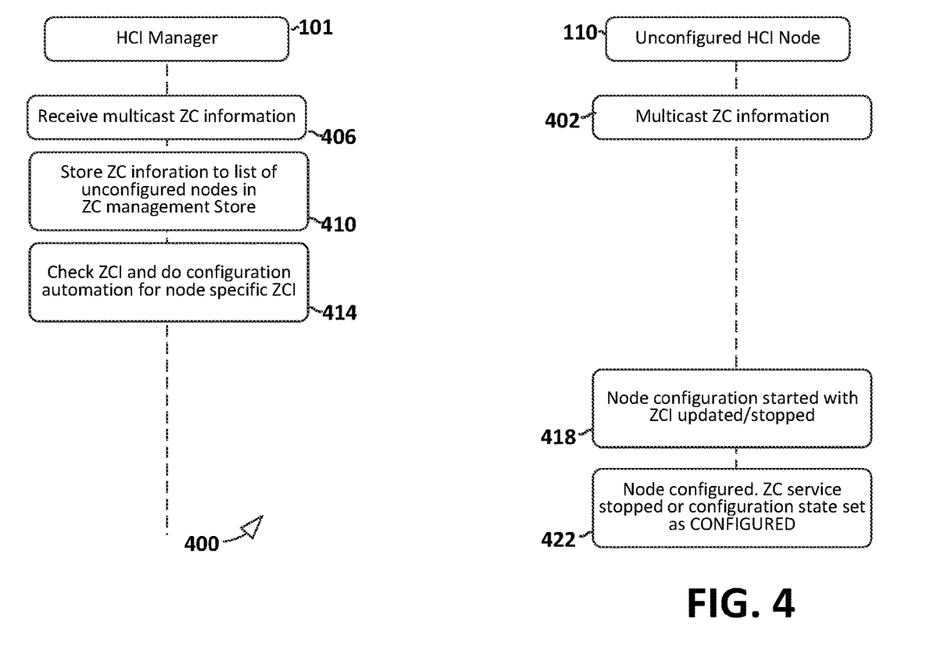
FIG. 4 illustrates a second zero configuration sequence diagram.

Referring now to FIG. 4, a sequence diagram illustrates exemplary operations 400 for configuring one or more nodes in an HCI cluster based on customized zero configuration information of the type described and illustrated in FIG. 3. Some or all of the cluster manager operations depicted in FIG. 4 may be performed by the zero configuration management service 104 (FIG. 1) in cluster manager 101 while some or all of the node operations depicted in FIG. 4 may be performed by the zero configuration check service 114 (FIG. 1).

The operations 400 illustrated in FIG. 4 begin with unconfigured node 110 multicasting (operation 402) its zero configuration and cluster manager 101 receiving (operation 406) the multicast zero configuration information from one or more unconfigured nodes. Cluster manager 101 may then collect the zero configuration information from each unconfigured node and store (operation 410) the information to a zero configuration management store. In at least some embodiments, the zero configuration information exchanged in operations 402 includes customized zero configuration information, e.g., zero configuration information that has been customized in accordance with the operations of FIG. 2.

Cluster manager 101 may then perform automated configuration (operation 414) for one or more specific nodes based on the customized zero configuration information. For example, the customized zero configuration information illustrated in FIG. 2 may be used to selectively identify all unconfigured nodes associated with the sales department or all nodes residing on the sales-rack of a data center. This information may be provided to each applicable node to trigger zero touch configuration (operation 418) of each applicable node. Continuing with the example begun in FIG. 2, the nodes containing customized zero configuration information indicating a node associated with the sales department may perform zero touch configuration. Once a node has been configured, the zero configuration service may be stopped (operation 422) or the node's configuration state may be set to terminate the zero configuration operations for the applicable node.

Figure 5:
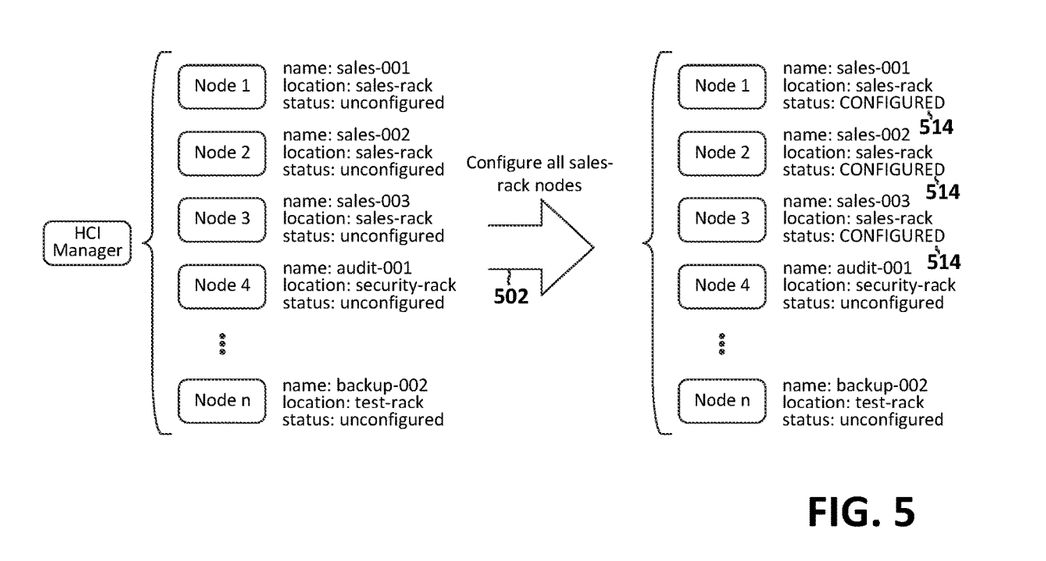
FIG. 5 illustrates exemplary zero configuration information following the operations illustrated in FIG. 4.

FIG. 5 illustrates exemplary zero configuration information before and after the operations 400 of FIG. 4 have been performed. In the example illustrated in FIG. 5, the zero configuration management service 104 (FIG. 1) may execute an instruction (502) to configure all unconfigured nodes located in a data center that has been assigned the name "sales-rack". The sales rack criteria is determined based upon the custom value of the location parameter in the zero configuration information of each unconfigured node.

In the exemplary cluster illustrated in FIG. 5, instruction 502 results in zero touch configuration of Nodes 1, 2, and 3, each of which has a location parameter custom value of "sales-rack". The configuration of Nodes 1, 2, and 3 may result in a change of value for the configuration state information and FIG. 5 illustrates a CONFIGURED value for the configuration status parameter 514 in nodes 1, 2, and 3. Node 4 and Node N, both of which have a different location parameter value, are not configured or otherwise altered by instruction 502. After completion of instruction 502, the zero configuration state of each node is illustrated in the right side of FIG. 5. Specifically, each of the sales-rack nodes, Node 1, Node 2, and Node 3, have a configuration status of CONFIGURED while the zero configuration information for all other nodes and parameters remains unchanged from its state prior to the execution of instruction 502.

Figure 6:
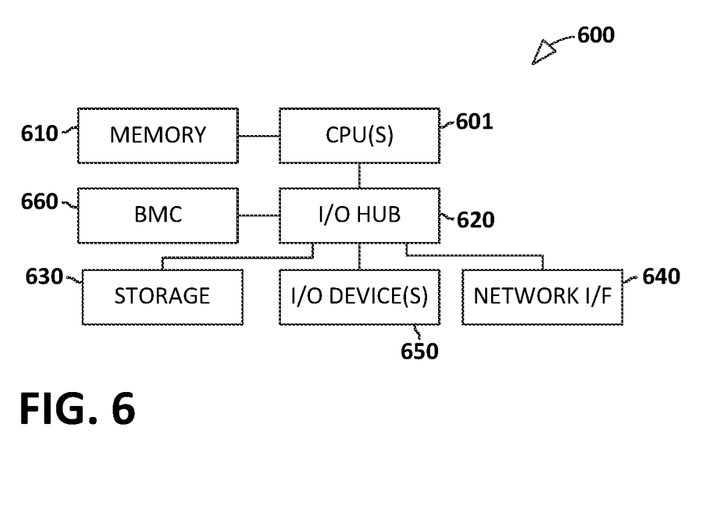
FIG. 6 illustrates an exemplary information handling system suitable for use in conjunction with features illustrated in FIGS. 1-5.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   obtaining, by a cluster manager, first zero configuration information for an unconfigured node of an information handling system cluster;
   generating custom zero configuration information for the unconfigured node;
   storing the custom zero configuration information in a zero configuration management store;
   retrieving, by the unconfigured node, the custom zero configuration information from the zero configuration management store; and
   modifying one or more zero configuration parameters of the unconfigured node in accordance with the custom zero configuration information.

2. The method of claim 1, further comprising:
   determining zero configuration criteria;
   identifying, based on the custom zero configuration information, unconfigured nodes of the cluster matching the zero configuration criteria; and
   selectively configuring the identified nodes.

3. The method of claim 1, wherein the zero configuration information includes node-specific zero configuration information including at least one of:
   configuration state information indicative of a configuration state of a corresponding node;
   hostname information indicative of a hostname for a corresponding node; and
   location information indicative of physical location of a corresponding node.

4. The method of claim 3, wherein the location information includes rack identification information indicative of a data center rack of the node.

5. The method of claim 1, wherein the node is implemented in a hyperconverged infrastructure (HCI) appliance comprising:
   compute, storage, and network resources;
   a central and automated cluster manager; and
   HCI software to expose the compute, storage, and network resources to the cluster management to support virtualized compute, storage, and network resources.

6. The method of claim 1, further comprising:
   multicasting, by the unconfigured node, the first zero configuration information via a Level 2 network, wherein obtaining the first zero configuration information comprises detecting the multicast information on the Level 2 network.

7. An information handling system comprising:
   a central processing unit (CPU); and
   a memory, accessible to the CPU, including executable instructions that, when executed by the CPU, cause the information handling system to perform operations comprising:
      obtaining, by a cluster manager, first zero configuration information for an unconfigured node of an information handling system cluster;
      generating custom zero configuration information for the unconfigured node;
      storing the custom zero configuration information in a zero configuration management store;
      retrieving, by the unconfigured node, the custom zero configuration information from the zero configuration management store; and
      modifying one or more zero configuration parameters of the unconfigured node in accordance with the custom zero configuration information.

8. The information handling system of claim 7, wherein the operations include:
   determining zero configuration criteria;
   identifying, based on the custom zero configuration information, unconfigured nodes of the cluster matching the zero configuration criteria; and
   selectively configuring the identified nodes.

9. The information handling system of claim 7, wherein the zero configuration information includes node-specific zero configuration information including at least one of:

configuration state information indicative of a configuration state of a corresponding node;

hostname information indicative of a hostname for a corresponding node; and location information indicative of physical location of a corresponding node.

10. The information handling system of claim 9, wherein the location information includes rack identification information indicative of a data center rack of the node.

11. The information handling system of claim 7, wherein the node is implemented in a hyperconverged infrastructure (HCI) appliance comprising:

compute, storage, and network resources;

a central and automated cluster manager; and

HCI software to expose the compute, storage, and network resources to the cluster management to support virtualized compute, storage, and network resources.

12. The information handling system of claim 7, wherein the operations include:

multicasting, by the unconfigured node, the first zero configuration information via a Level 2 network, wherein detecting the multicast information on the Level 2 network.

13. A non-transitory computer readable medium comprising processor executable instructions that, when executed by a processor of an information handling system, cause the system to perform operations, the operations comprising:

obtaining, by a cluster manager, first zero configuration information for an unconfigured node of an information handling system cluster;

generating custom zero configuration information for the unconfigured node;

storing the custom zero configuration information in a zero configuration management store;

retrieving, by the unconfigured node, the custom zero configuration information from the zero configuration management store; and modifying one or more zero configuration parameters of the unconfigured node in accordance with the custom zero configuration information.

14. The computer readable medium of claim 13, wherein the operations include:

determining zero configuration criteria;

identifying, based on the custom zero configuration information, unconfigured nodes of the cluster matching the zero configuration criteria; and selectively configuring the identified nodes.

15. The computer readable medium of claim 13, wherein the zero configuration information includes node-specific zero configuration information including at least one of:

configuration state information indicative of a configuration state of a corresponding node;

hostname information indicative of a hostname for a corresponding node; and location information indicative of physical location of a corresponding node.

16. The computer readable medium of claim 15, wherein the location information includes rack identification information indicative of a data center rack of the node.

17. The computer readable medium of claim 13, wherein the node is implemented in a hyperconverged infrastructure (HCI) appliance comprising:

compute, storage, and network resources;

a central and automated cluster manager; and

HCI software to expose the compute, storage, and network resources to the cluster management to support virtualized compute, storage, and network resources.

18. The computer readable medium of claim 13, wherein the operations include:

multicasting, by the unconfigured node, the first zero configuration information via a Level 2 network, wherein detecting the multicast information on the Level 2 network.

\* \* \* \* \*